United States Patent
Kim et al.

(10) Patent No.: US 9,436,208 B2
(45) Date of Patent: Sep. 6, 2016

(54) GEAR SHIFT LEVER APPARATUS OF ELECTRONIC MANUAL TRANSMISSION FOR VEHICLE

(71) Applicant: Hyundai Motor Company, Seoul (KR)

(72) Inventors: Eun Sik Kim, Gwangmyeong-si (KR); Jeong Seop Lee, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 115 days.

(21) Appl. No.: 14/320,038

(22) Filed: Jun. 30, 2014

(65) Prior Publication Data

US 2015/0107393 A1  Apr. 23, 2015

(30) Foreign Application Priority Data

Oct. 17, 2013  (KR) .................. 10-2013-0124232

(51) Int. Cl.
| | |
|---|---|
| *G05G 9/047* | (2006.01) |
| *G05G 9/053* | (2006.01) |
| *F16H 59/04* | (2006.01) |
| *F16H 59/10* | (2006.01) |
| *F16H 59/02* | (2006.01) |

(52) U.S. Cl.
CPC .............. *G05G 9/053* (2013.01); *F16H 59/04* (2013.01); *F16H 59/044* (2013.01); *F16H 59/105* (2013.01); *F16H 2059/0269* (2013.01); *G05G 2009/04711* (2013.01); *G05G 2009/04755* (2013.01); *G05G 2009/04774* (2013.01); *Y10T 74/20165* (2015.01)

(58) Field of Classification Search
CPC .............. F16H 59/0278; F16H 59/042; F16H 59/105; F16H 2059/0269; F16H 2059/0259; G05G 2009/04781; G05G 2009/04755; G05G 2009/04748; G05G 2009/0474; G05G 2009/04707; G05G 2009/04703; G05G 9/053; G05G 2009/04711; G05G 2009/04774
USPC ...... 74/471 R, 473.1, 473.12, 473.3, 473.34, 74/473.35
See application file for complete search history.

(56) References Cited

U.S. PATENT DOCUMENTS

| | | | | |
|---|---|---|---|---|
| 3,900,817 A | * | 8/1975 | Punt ...................... | H01C 10/28 338/157 |
| 4,500,867 A | * | 2/1985 | Ishitobi .................. | G01D 5/145 200/6 A |
| 5,421,694 A | * | 6/1995 | Baker .................... | G05G 9/047 200/6 A |
| 5,969,520 A | * | 10/1999 | Schottler ................ | G01D 5/145 200/6 A |

(Continued)

FOREIGN PATENT DOCUMENTS

| | | |
|---|---|---|
| JP | 2002-254952 A | 9/2002 |
| JP | 2004-139578 A | 5/2004 |

(Continued)

*Primary Examiner* — Terence Boes
*Assistant Examiner* — Joseph Brown
(74) *Attorney, Agent, or Firm* — Morgan, Lewis & Bockius LLP

(57) ABSTRACT

A gear shift lever apparatus of an electronic manual transmission for a vehicle may include a spherical gear shift lever installed in a console to be rotated in leftward and rightward selecting directions and in forward and rearward shifting directions, a lever guide unit installed in the spherical gear shift lever and the console, for guiding rotation of the spherical gear shift lever when the spherical gear shift lever is rotated in the selecting directions and the shifting directions, and a lever sensor unit installed in the spherical gear shift lever and the console, for detecting a neutral position and/or a selected gear shaft stage of the spherical gear shift lever.

18 Claims, 11 Drawing Sheets

(56) References Cited

U.S. PATENT DOCUMENTS

| | | | | |
|---|---|---|---|---|
| 6,501,458 B2* | 12/2002 | Baker | ............... | E02F 9/2004 345/161 |
| 6,664,666 B2* | 12/2003 | Corcoran | ............... | G05G 9/047 310/12.23 |
| 7,106,303 B2* | 9/2006 | Bricaud | ............... | G06F 3/03549 345/167 |
| 7,236,158 B2* | 6/2007 | Iisaka | ............... | G06F 3/03549 345/164 |
| 7,841,799 B2* | 11/2010 | Spratte | ............... | F16C 11/0604 403/122 |
| 7,965,282 B2* | 6/2011 | Yamada | ............... | B60K 37/06 200/5 R |
| 8,139,033 B2* | 3/2012 | Yamamoto | ............... | G06F 3/033 345/167 |
| 9,046,167 B2* | 6/2015 | Farges | ............... | F16H 59/044 |

FOREIGN PATENT DOCUMENTS

| | | |
|---|---|---|
| KR | 1020040043856 A | 5/2004 |
| KR | 10-0604441 B1 | 7/2006 |
| KR | 10-2007-0005054 A | 1/2007 |
| KR | 1020090062975 A | 6/2009 |
| KR | 10-2012-0037244 A | 4/2012 |
| WO | WO 2010/119348 A1 | 10/2010 |

\* cited by examiner

GEAR SHIFT LEVER APPARATUS OF ELECTRONIC MANUAL TRANSMISSION FOR VEHICLE

CROSS REFERENCE TO RELATED APPLICATION

The present application claims priority of Korean Patent Application Number 10-2013-0124232 filed on Oct. 17, 2013, the entire contents of which application are incorporated herein for all purposes by this reference.

BACKGROUND OF INVENTION

1. Field of Invention

The present invention relates to a gear shift lever apparatus of an electronic manual transmission for a vehicle, and more particularly, to a gear shift lever apparatus of an electronic manual transmission for a vehicle in which a rod-shaped gear shift lever is improved into a spherical shape.

2. Description of Related Art

In general, transmissions mounted to a vehicle function to convert driving power generated by an engine according to a travel state of a vehicle during a travel of the vehicle and transmit the converted power to driving wheels, and are classified into manual, automatic, and continuously variable transmissions according to operation methods thereof.

As shown in FIG. 1, in a manual transmission, a select cable 2 and a shift cable 3 receive tensions, respectively according to a manipulation of a gear shift lever 1 installed in an interior of a vehicle to independently operate a select lever 5 and a shift lever 6 installed in a transmission 4, so that power is transmitted through one of a plurality of gear trains installed in the transmission 4 according to a gear shift of the vehicle.

However, the gear shift lever 1 of the manual transmission vehicle has a straight rod shape, and an upper side thereof protrudes into the interior of the vehicle through a console, so that a passenger may be injured by the gear shift lever 1 protruding into the interior of the vehicle when an accident occurs.

Further, in the gear shift lever 1 of the manual transmission according to the related art, a driver should move an entire arm due to a big manipulation stroke, and accordingly, a convenience of the driver according to the manipulation of the gear shift lever 1 lowers. In particular, a package layout of peripheral components (a parking lever, a center fascia and the like) of the gear shift lever 1 is spatially restricted.

In addition, the conventional gear shift lever 1 has a rough straight shape, so a degree of freedom in design is so low that it cannot help make the image of the vehicle luxurious.

Meanwhile, an electronic manual transmission vehicle excluding use of the select cable 2 and the shift cable 3 from the manual transmission vehicle transmits an electronic signal during manipulation of a gear shift lever, and an actuator having received the electronic signal operates a select lever and a shift lever of the transmission to perform a gear shift operation. However, in most cases, straight gear shift levers are used in the electronic manual transmission vehicle, so that the electronic manual transmission vehicle also has the same disadvantages as those of the manual transmission vehicle.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention is to provide a gear shift lever apparatus of an electronic manual transmission for a vehicle in which a straight rod-shaped gear shift lever is improved into a spherical gear shift lever, so that a protrusion of the gear shift lever into an interior of a vehicle may be eliminated or minimized and accordingly, an injury to a passenger by the gear shift lever may be prevented in advance when an accident occurs.

The present invention is to provide a gear shift lever apparatus of an electronic manual transmission for a vehicle in which a stroke according to a gear shift manipulation through the spherical gear shift lever may be minimized, and accordingly, a convenience of a driver according to the gear shift manipulation may be improved and a package layout of peripheral components of the gear shift lever may be advantageously determined.

The present invention is to provide a gear shift lever apparatus of an electronic manual transmission for a vehicle in which a degree of freedom in design may be increased through the spherical gear shift lever, and accordingly, a luxurious image of the vehicle may be achieved.

According to various aspects of the present invention, there is provided a gear shift lever apparatus of an electronic manual transmission for a vehicle, including: a spherical gear shift lever installed in a console to be rotated in leftward and rightward selecting directions and in forward and rearward shifting directions; a lever guide unit installed in the spherical gear shift lever and the console, for guiding rotation of the spherical gear shift lever when the spherical gear shift lever is rotated in the selecting directions and the shifting directions; and a lever sensor unit installed in the spherical gear shift lever and the console, for detecting a neutral position and/or a selected gear shaft stage of the spherical gear shift lever.

An installation hole for installation of the spherical gear shift lever may be formed in the console, and a positioning surface having substantially the same curve as that of an outer circumference of the spherical gear shift lever may be formed between an upper surface of the console and the installation hole such that the spherical gear shift lever is rotatably installed while being positioned on the positioning surface.

A manipulation recess may be formed at a center or a center portion of an upper end of the spherical gear shift lever for easy manipulation of the spherical gear shift lever. The center of the upper end of the spherical gear shift lever may be exposed to an upper side of the console, and a center of a lower end of the spherical gear shift lever may pass through the installation hole to be exposed to a bottom surface of the console.

The lever guide unit may include: two selecting position magnets installed on an outer circumferential surface in the selecting directions of the spherical gear shift lever; and two selecting guide magnets installed on the positioning surface of the console to face the selecting position magnets, respectively. The two selecting position magnets may be located on a selecting direction center line crossing a center of an upper end of the spherical gear shift lever when the spherical gear shift lever is viewed from a top and be installed at an interval of substantially 180 degrees.

The lever guide unit may further include: two shifting position magnets installed on an outer circumferential surface in the shifting directions of the spherical gear shift lever; and two shifting guide magnets installed on the positioning surface of the console to face the shifting position magnets, respectively. The two shifting position magnets may be located on a shifting direction center line crossing the center of the upper end of the spherical gear shift lever when the spherical gear shift lever is viewed from the top and be installed at an interval of substantially 180 degrees.

The lever guide unit may further include two selecting/shifting guide magnets installed on the positioning surface of the console to be located at opposite ends of the selecting guide magnets, for guiding movement of the selecting position magnets when the spherical gear shift lever is selecting-rotated and then shifting-rotated continuously.

An attractive force may be applied between the selecting position magnets and the selecting guide magnets. An attractive force may be applied between the shifting position magnets and the shifting guide magnets. An attractive force may be applied between the selecting position magnets and the selecting/shifting guide magnets.

One or each of the selecting guide magnets and the shifting guide magnets may have a rectangular cross-section, and opposite ends thereof extend along a heightwise direction of the positioning surface of the console. One or each of the two selecting/shifting guide magnets may be formed to have an arc-shaped curve along movement loci of the selecting position magnets according to the shifting-rotation of the spherical gear shift lever when the spherical gear shift lever is selecting-rotated and then shifting-rotated continuously.

The two selecting/shifting guide magnets each having an arc-shaped curve may be vertically substantially symmetrical to each other about the selecting position magnets. The two selecting/shifting guide magnets each having an arc-shaped curve may be left-right substantially symmetrical to each other about the selecting guide magnets.

The lever sensor unit may include: a lower end center magnet installed at a center of a lower end of the spherical gear shift lever, for generating a strong magnetic force; an attractive force generating member fixedly installed on a bottom surface of the console facing the lower end center magnet, for applying an attractive force with the lower end center magnet; and a three-dimensional sensor coupled to the attractive force generating member, for detecting a position of the lower end center magnet when the spherical gear shift lever is selecting-rotated and/or shifting-rotated to detect a neutral position and/or a selected gear shift stage of the spherical gear shift lever.

The three-dimensional sensor may be embedded in the attractive force generating member.

If the spherical gear shift lever is selecting-rotated and then shifting-rotated continuously, one of the travel stages may be selected, and the three-dimensional sensor may generate a signal for the selected travel stage.

A strength of an attractive force generating between the selecting position magnets and the selecting guide magnets, a strength of an attractive force generated between the shifting position magnets and the shifting guide magnets, and a strength of an attractive force generating between the selecting position magnets and the selecting/shifting guide magnets may be substantially the same, and a strength of an attractive force generated between the lower end center magnet and the attractive force generating member may be at least two times higher than the strength of an attractive force generated between the selecting position magnets and the selecting guide magnets.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
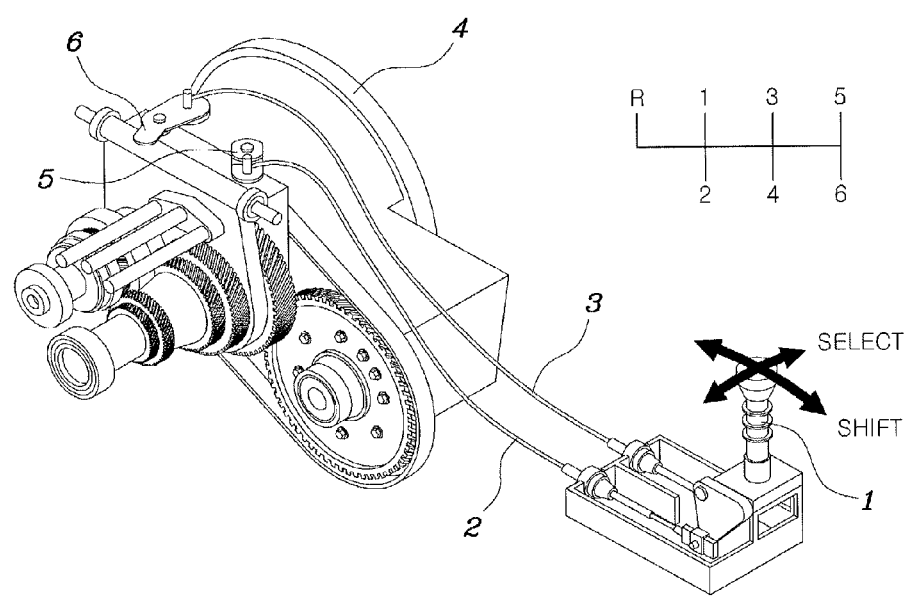
FIG. 1 is a view for explaining a conventional gear shift lever employed in a manual transmission.
Figure 2:
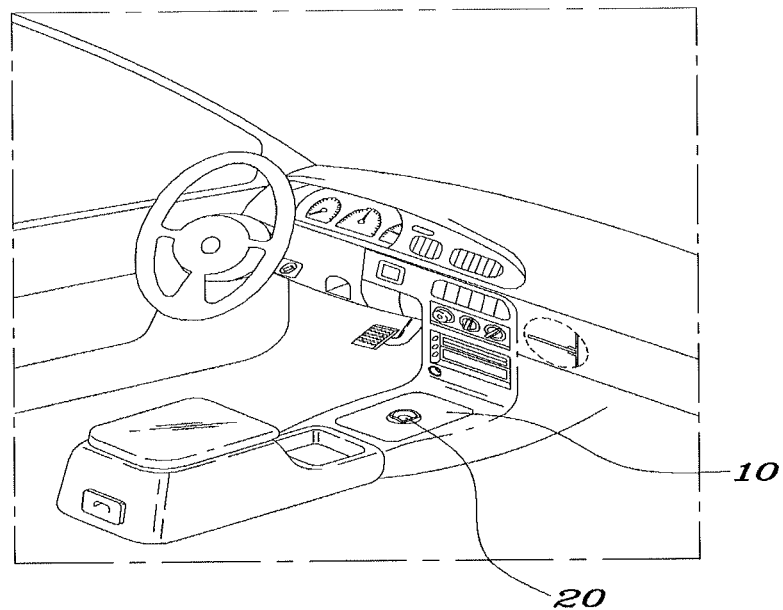
FIG. 2 is a view showing a state in which an exemplary gear shift lever apparatus of an electronic manual transmission according to the present invention is installed in a console.
Figure 3:
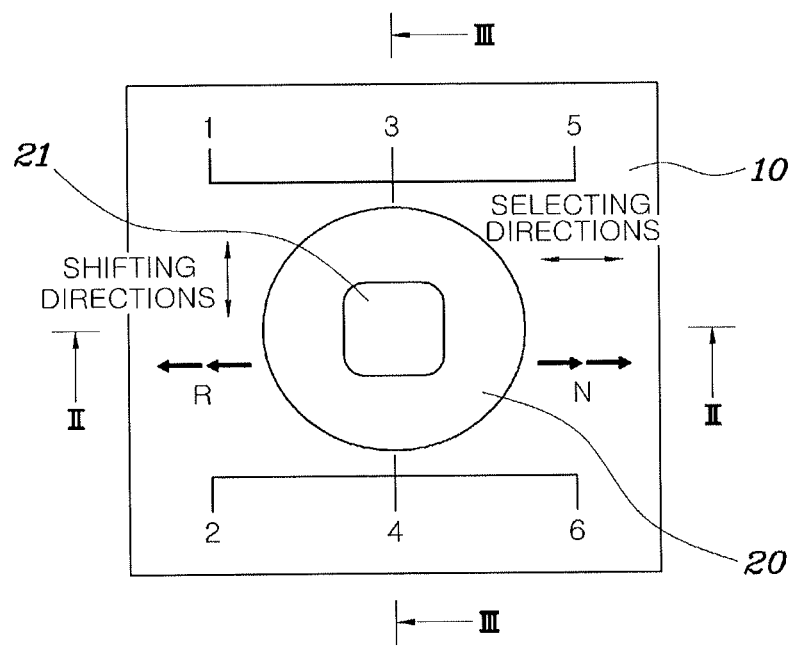
FIG. 3 is a plan view showing a state in which an exemplary spherical gear shift lever is installed in a console according to the present invention.
Figure 4:
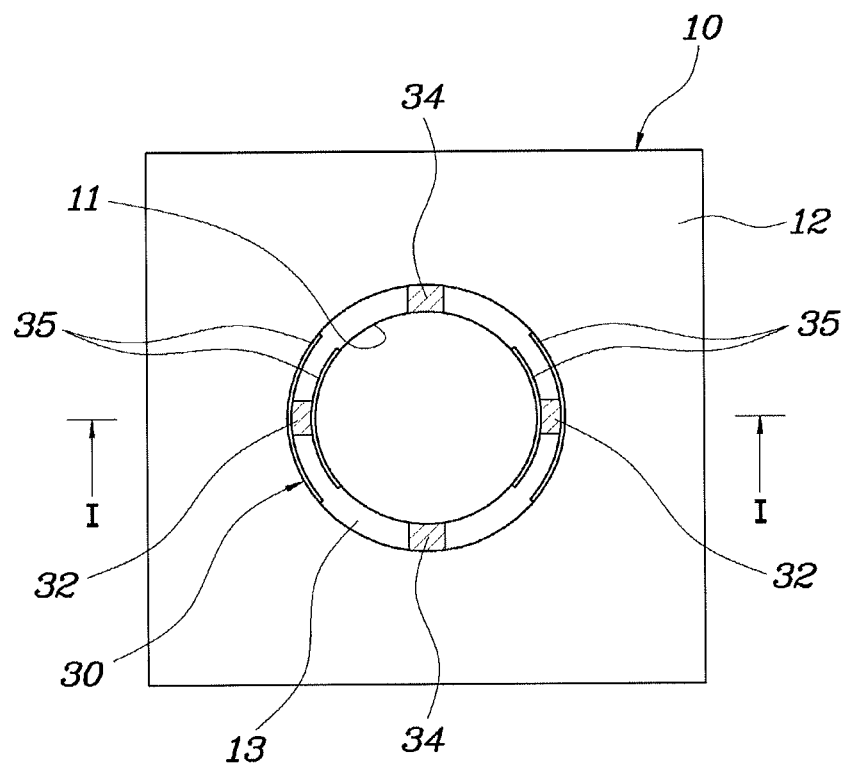
FIG. 4 is a plan view showing a console in which an exemplary spherical gear shift lever is installed.
Figure 5:
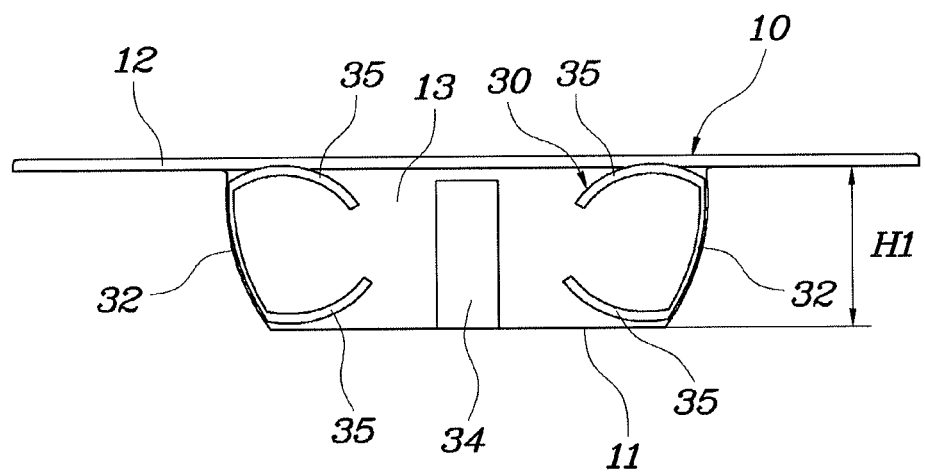
FIG. 5 is a cross-sectional view taken along line I-I of FIG. 4.
Figure 6:
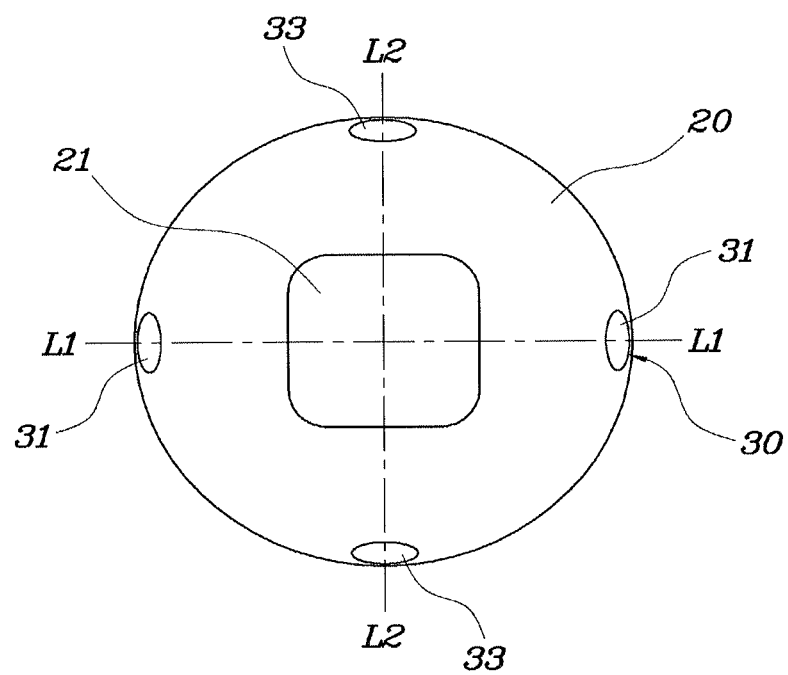
FIGS. 6 and 7 are a plan view and a front view showing an exemplary spherical gear shift lever according to the present invention.
Figure 7:
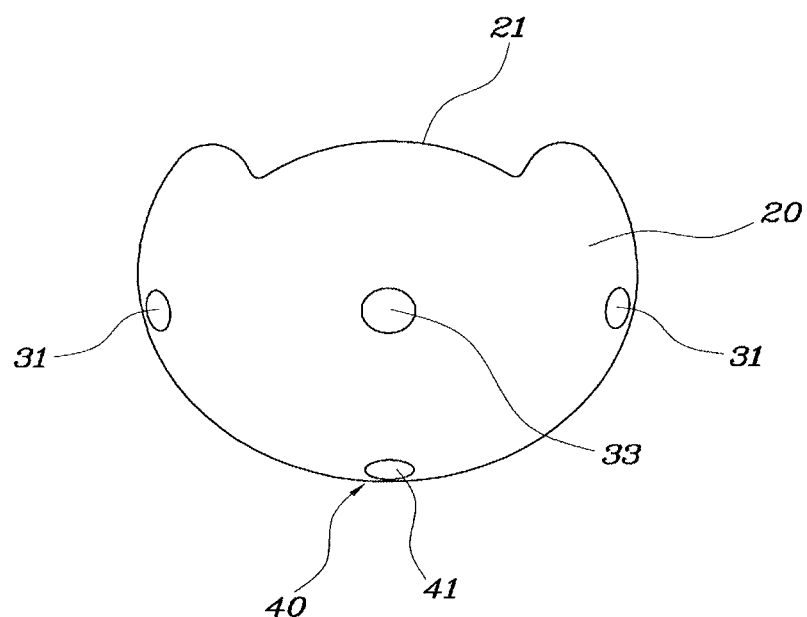

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

As shown in FIGS. 2 to 9, the gear shift lever apparatus of an electronic manual transmission for a vehicle according to various embodiments of the present invention includes a spherical gear shift lever 20 installed in a console 10 to be rotated in leftward and rightward selecting directions and in forward and rearward shifting directions; a lever guide unit 30 installed in the spherical gear shift lever 20 and the console 10, for guiding rotation of the spherical gear shift lever 20 when the spherical gear shift lever 20 is rotated in the selecting directions and the shifting directions; and a lever sensor unit 40 installed in the spherical gear shift lever 20 and the console 10, for detecting a neutral position of the spherical gear shift lever 20 and/or a selected gear shaft stage.

Here, an installation hole 11 for installation of the spherical gear shift lever 20 is formed in the console 10, and a positioning surface 13 having the same or substantially the same curve as that of an outer circumference of the spherical gear shift lever 20 is formed between an upper surface 12 of the console 10 and the installation hole 11 such that the spherical gear shift lever 20 is rotatably installed while being positioned on the positioning surface 13.

A manipulation recess 21 into which a hand of a user (driver) may be inserted such that the user may easily manipulate the spherical gear shift lever 20 is formed at a center or a center portion of an upper end of the spherical gear shift lever 20. The manipulation recess 21 may have various shapes such as a tetragon or a circle.

The center of an upper end of the spherical gear shift lever 20 is exposed to an upper side of the console 10, and the center of a lower end of the spherical gear shift lever 20 passes through the installation hole 11 to be exposed to a bottom surface 14 of the console 10.

A portion of the spherical gear shift lever 20 exposed to the interior of the vehicle through an upper surface 12 of the console 10 corresponds to the manipulation recess 21, and it is preferable that the exposed portion has a minimum height. Accordingly, injury to a passenger due to the spherical gear shift lever 20 may be prevented during an accident.

Meanwhile, the lever guide unit 30 according to the present invention includes two selecting position magnets 31 installed on an outer circumferential surface in the selecting directions of the spherical gear shift lever 20; and two selecting guide magnets 32 installed on the positioning surface 13 of the console 10 to face the selecting position magnets 31, respectively.

The lever guide unit 30 according to the present invention further includes two shifting position magnets 33 installed on an outer circumferential surface in the shifting directions of the spherical gear shift lever 20; and two shifting guide magnets 34 installed on the positioning surface 13 of the console 10 to face the shifting position magnets 33, respectively.

The lever guide unit 30 according to the present invention further includes two selecting/shifting guide magnets 35 installed on the positioning surface 13 of the console 10 to be located at opposite ends of the selecting guide magnets 32, for guiding movement of the selecting position magnets 31 when the spherical gear shift lever 20 is selecting-rotated and then shifting-rotated continuously.

Here, the two selecting position magnets 31 are located on a selecting direction center line L1 crossing the center of an upper end of the spherical gear shift lever 20 when the spherical gear shift lever 20 is viewed from the top and are installed at an interval of 180 degrees or substantially 180 degrees.

The two shifting position magnets 33 are located on a shifting direction center line L2 crossing the center of an upper end of the spherical gear shift lever 20 when the spherical gear shift lever 20 is viewed from the top and are installed at an interval of 180 degrees or substantially 180 degrees.

An attractive force is applied between the selecting position magnets 31 and the selecting guide magnets 32, an attractive force is also applied between the shifting position magnets 33 and the shifting guide magnets 34, and an attractive force is applied between the selecting position magnets 31 and the selecting/shifting guide magnets 35.

The selecting guide magnets 32 and the shifting guide magnets 34 have a rectangular or substantially rectangular cross-section, and opposite ends thereof extend along a heightwise direction H1 of the positioning surface 13 of the console 10.

Thus, the selecting guide magnets 32 may include all the movement range of the selecting position magnets 31 when the spherical gear shift lever 20 is selecting-rotated and the shifting guide magnets 34 may include all the movement range of the shifting position magnets 33 when the spherical gear shift lever 20 is shifting-rotated. Accordingly, the gear shift manipulation of the spherical gear shift lever 20 may be performed more accurately.

The two selecting/shifting guide magnets 35 are formed to have an arc-shaped curve along movement loci of the selecting position magnets 31 according to the shifting-rotation of the spherical gear shift lever 20 when the spherical gear shift lever 20 is selecting-rotated and then shifting-rotated continuously.

Here, the two selecting/shifting guide magnets 35 each having an arc-shaped curve are vertically symmetrical or substantially symmetrical to each other about the selecting position magnets 31, and are left-right symmetrical or substantially symmetrical to each other about the selecting guide magnets 32.

The lever sensor unit 40 according to the present invention includes a lower end center magnet 41 installed at the center of a lower end of the spherical gear shift lever 20, for generating a strong magnetic force; an attractive force generating member 42 fixedly installed on the bottom surface 14 of the console 10 facing the lower end center magnet 41, for applying an attractive force with the lower end center magnet 41; and a three-dimensional sensor 43 coupled to the attractive force generating member 42, for detecting a position of the lower end center magnet 41 when the spherical gear shift lever 20 is selecting-rotated and shifting-rotated to detect a neutral position and a selected gear shift stage of the spherical gear shift lever 20.

It is preferable, in some embodiments, that the attractive force generating member 42 is a magnet having an opposite polarity to that of the lower end center magnet 41 or a steel plate.

The three-dimensional sensor 43 may be buried or embedded in the attractive force generating member 42 and the attractive force generating member 42 may be buried or embedded in the three-dimensional sensor 43 if necessary, in which case an upper surface of the three-dimensional sensor 43 is exposed to the outside to face the lower end center magnet 41.

Meanwhile, the three-dimensional sensor 43 is adapted to detect a position of the lower end center magnet 41 by using coordinates of the X-axis, the Y-axis, and the Z-axis, and is disclosed in various patent documents such as Korean Patent No. 10-0882737 and a detailed description thereof will be omitted.

If the spherical gear shift lever 20 is continuously rotated twice in the selecting directions in a predetermined time period, the three-dimensional sensor 43 generates a signal for a rear stage (R stage) or a neutral stage (N stage).

Further, if the spherical gear shift lever 20 is selecting-rotated and then shifting-rotated continuously, one of the travel stages (one of first to sixth stages) is selected, in which case the three-dimensional sensor 43 according to the present invention generates a signal for the selected travel stage.

Meanwhile, if an external force is not applied to the spherical gear shift lever 20 by a user, the lower end center magnet 41 and the attractive force generating member 42 return to neutral positions that always face each other by an attractive force between the lower end center magnet 41 and the attractive force generating member 42.

Thereto, according to the present invention, the strength of an attractive force generating between the selecting position magnets 31 and the selecting guide magnets 32, a strength of an attractive force generated between the shifting position magnets 33 and the shifting guide magnets 34, and a strength of an attractive force generating between the selecting position magnets 31 and the selecting/shifting guide magnets 35 are the same, and it is preferable, in some embodiments, that the strength of an attractive force generated between the lower end center magnet 41 and the attractive force generating member 42 are at least two times higher than the strength of an attractive force generated between the selecting position magnets 31 and the selecting guide magnets 32.

Hereinafter, an operation of the gear shift lever apparatus according to the present invention will be described.

Figure 8:
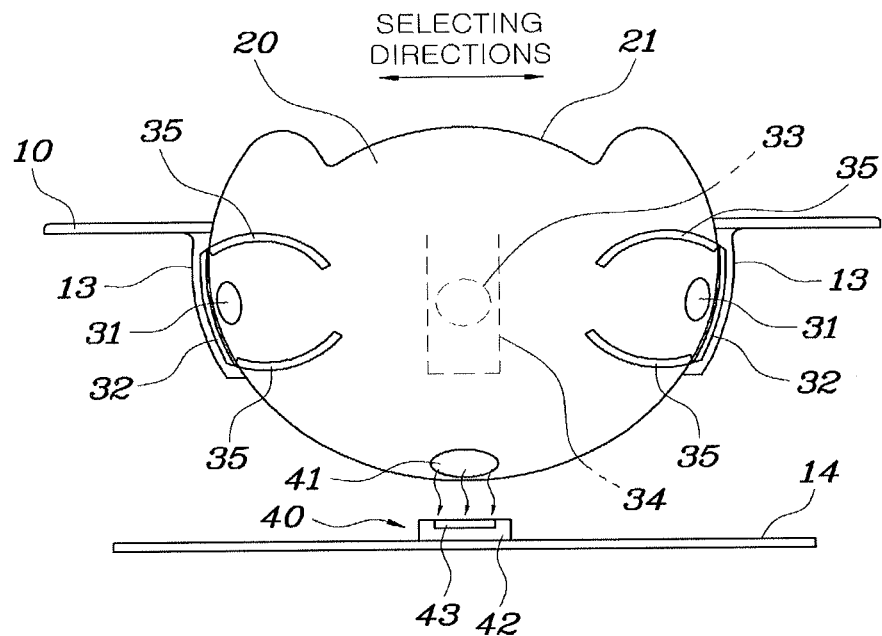
FIGS. 8 and 9 are cross-sectional views taken along lines II-II and III-III of FIG. 3.
Figure 9:
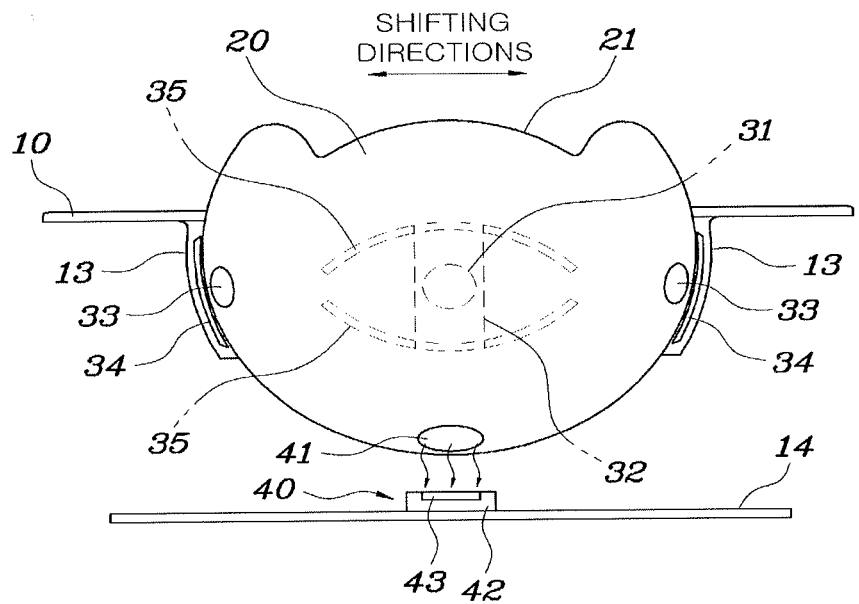

As shown in FIGS. 8 and 9, a state in which the lower end center magnet 41 and the three-dimensional sensor 43 face each other corresponds to a neutral position (initial position).

Figure 10:
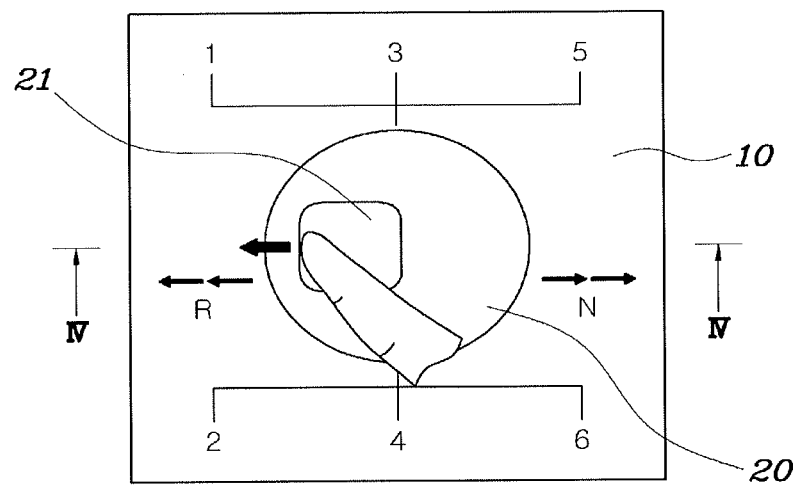
FIG. 10 is a view showing an operation state of a rear stage (R stage) of an exemplary spherical gear shift lever according to the present invention.
Figure 11:
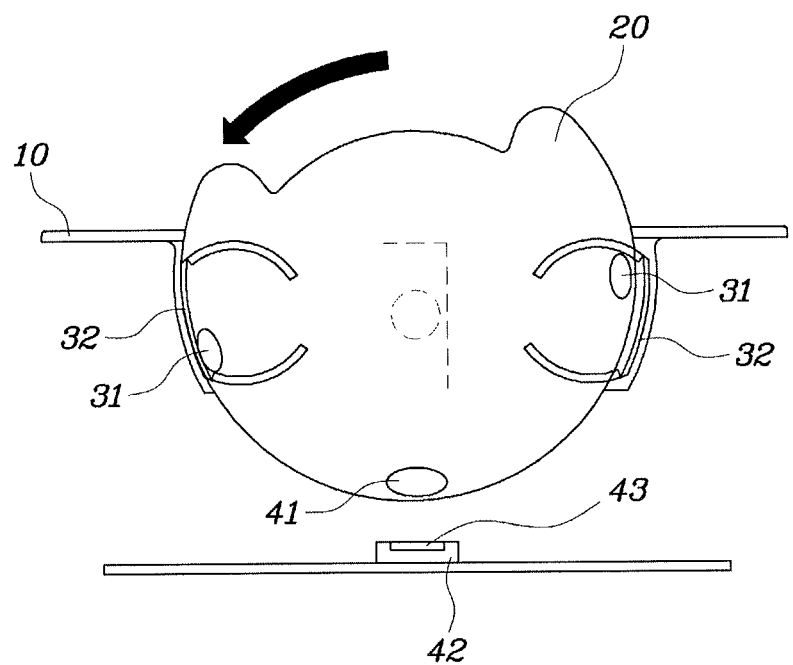
FIG. 11 is a cross-sectional view taken along line IV-IV of FIG. 10.

FIG. 10 shows a state in which the gear shift stage is manipulated to a rear stage (R stage). That is, if a user continuously rotates the spherical gear shift lever 20 twice in a leftward selecting direction from the neutral position, the gear shift stage is shifted to the rear stage (R stage).

If the spherical gear shift lever 20 at the neutral position is rotated in the leftward selecting direction for shifting of the rear stage (R stage), the selecting position magnets 31 are moved along the selecting guide magnets 32 and the lower end center magnet 41 is moved to the right side of the three-dimensional sensor 43. Accordingly, the three-dimensional sensor 43 detects a position of the lower end center magnet 41.

If the lower end center magnet 41 returns to a neutral position after being moved to the right side of the three-dimensional sensor 43 once and the lower end center magnet 41 is moved to the right side of the three-dimensional sensor 43 twice continuously, the three-dimensional sensor 43 generates a signal for a rear stage and the controller receives the signal for a rear stage generated by the three-dimensional sensor 43 to control an operation of the actuator for actuating a select lever and a shift lever of the transmission. Accordingly, a gear shift to the rear stage is performed.

The gear shift to the neutral stage (N stage) is performed in an opposite direction to the gear shift to the rear stage (R stage). That is, the spherical gear shift lever 20 located in the neutral position is continuously rotated twice in the right selecting direction.

Figure 12:
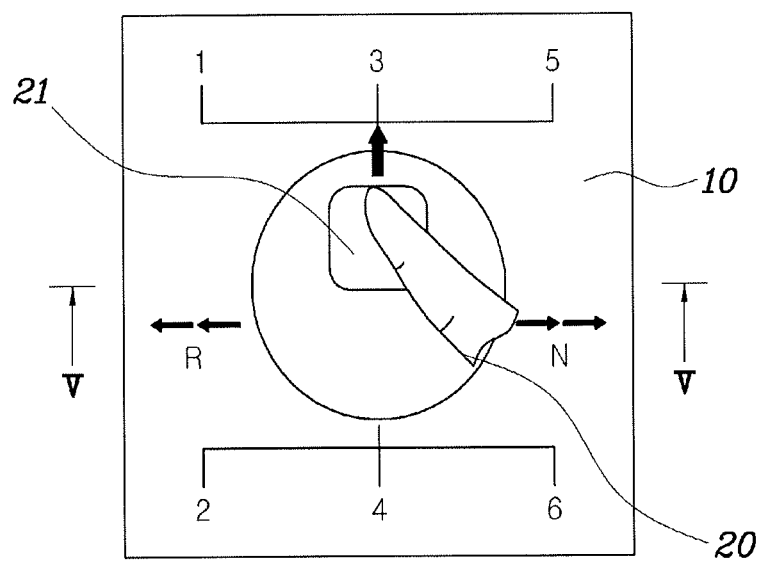
FIG. 12 is a view showing a third stage operation state of an exemplary spherical gear shift lever according to the present invention.
Figure 13:
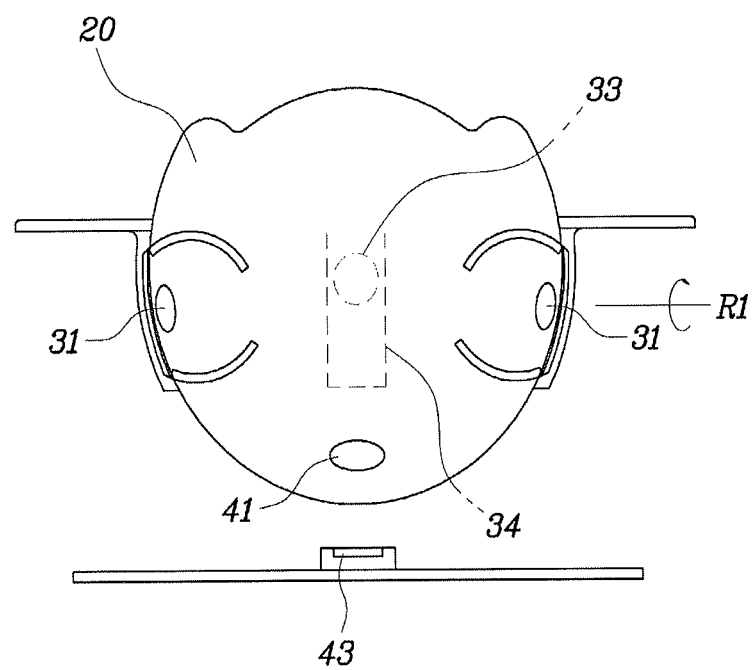
FIG. 13 is a cross-sectional view taken along line V-V of FIG. 12.

FIGS. 12 and 13 show a state in which the gear shift stage is manipulated to a third stage among the travel stages.

If the spherical gear shift lever 20 at the neutral position is rotated in the upward shifting direction for the gear shift to the third stage, the spherical gear shift lever 20 is rotated (as indicated by an arrow R1) about the selecting position magnets 31, in which case the shifting position magnets 33 are moved along the shifting guide magnets 34 and the lower end center magnet 41 is moved to the rear side (a direction where a fourth stage is indicated) of the three-dimensional sensor 43. Then, the three-dimensional sensor 43 detects a position of the lower end center magnet 41 and generates a gear shift signal for the third stage.

If the spherical gear shift lever 20 is rotated toward the third stage and a user removes an external force, the spherical gear shift lever 20 rotated in the shifting direction returns to the neutral position by a strong attractive force between the lower end center magnet 41 and the attractive force applying member 42.

The fourth stage manipulation is opposite to the third stage manipulation, and a detailed description thereof will be omitted.

FIGS. 14A to 14D show stages in which the gear shift stage is manipulated to the first stage among the travel stages.

A description of the second stage, fifth stage, and sixth stage gear shift manipulations similar to the first stage gear shift manipulation will be omitted.

Figure 14A:
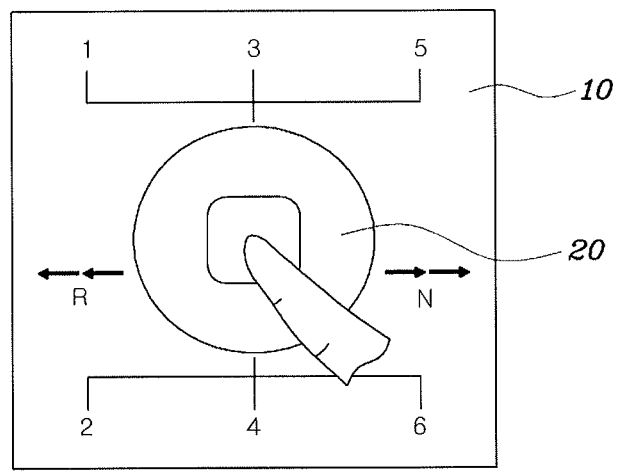
FIGS. 14A to 14D are views showing a first stage operation state of an exemplary spherical gear shift lever according to the present invention.
Figure 14A:
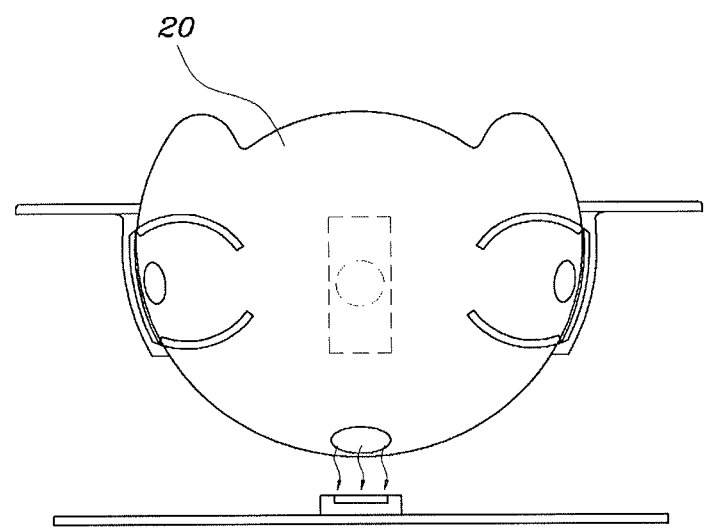
Figure 14B:
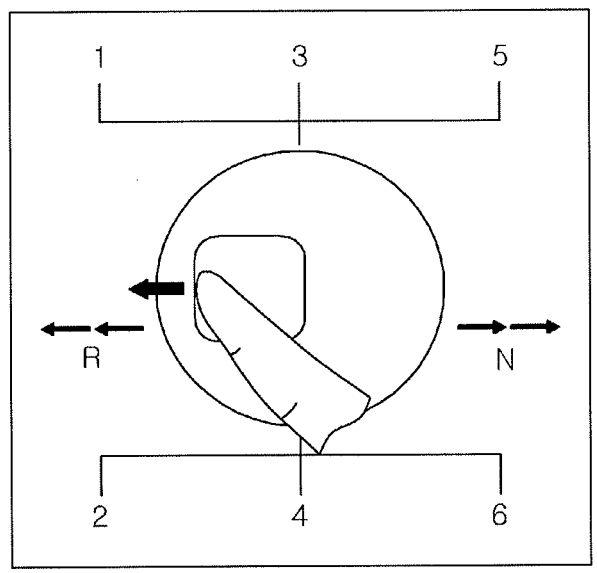
Figure 14B:
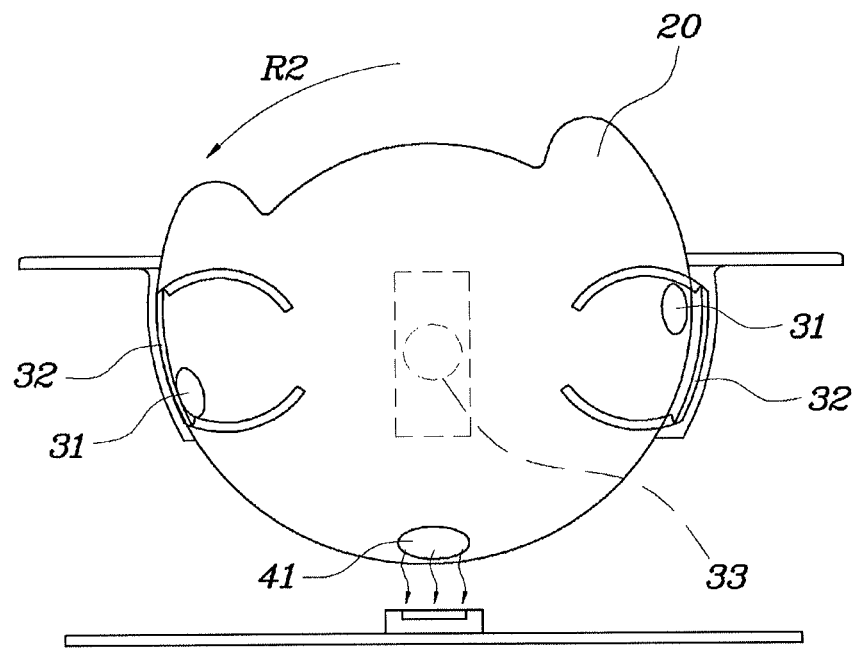
Figure 14C:
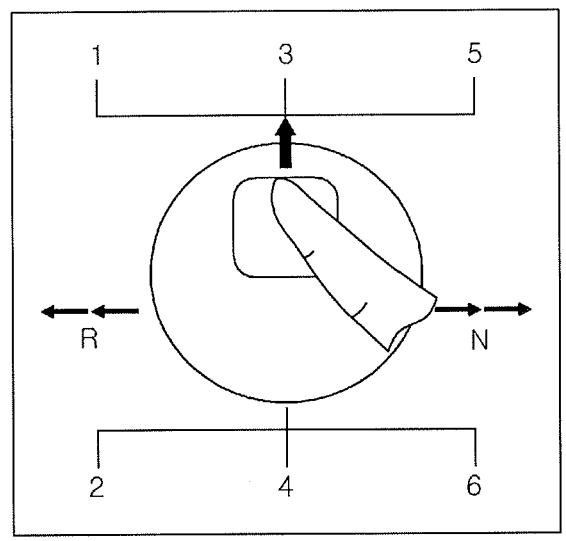
Figure 14C:
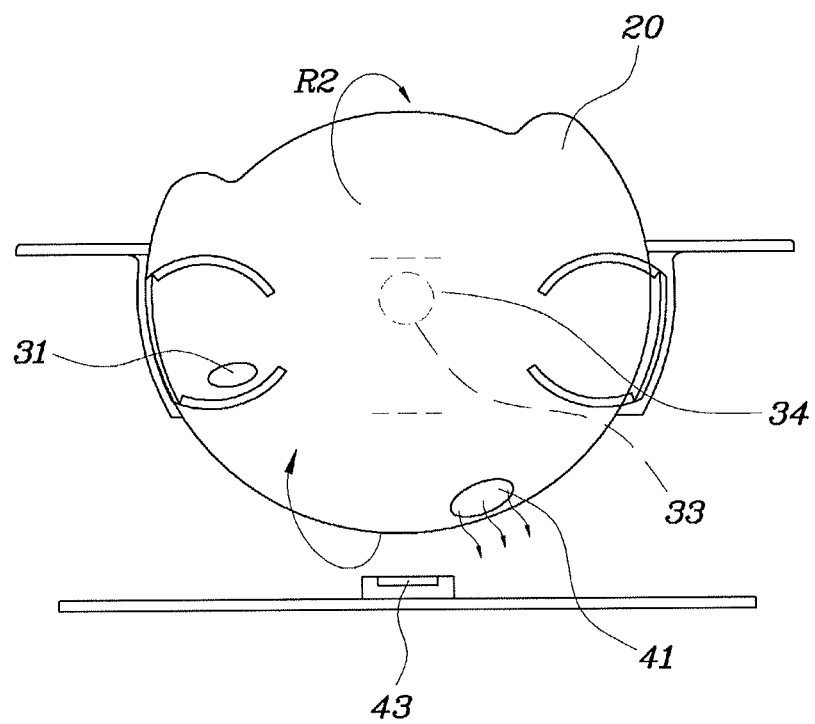

For the first stage gear shift manipulation, if the spherical gear shift lever 20 located at the neutral position as in FIG. 14A is rotated in the leftward selecting direction as in FIG. 14B and the spherical gear shift lever 20 is continuously rotated in the upward shifting direction as in FIG. 14C, the first stage gear shift manipulation is completed.

That is, the spherical gear shift lever 20 located at the neutral position as in FIG. 14A is rotated in the leftward selecting direction as in FIG. 14B, the spherical gear shift lever 20 is rotated (an arrow R2) about the shifting position magnets 33 and the selecting position magnets 31 are moved along the selecting guide magnets 32.

Subsequently, if the spherical gear shift lever 20 in the state as in FIG. 14B is rotated in the upward shifting direction as in the state as in FIG. 14C, the spherical gear shift lever 20 is rotated as indicated by an arrow R3, the selecting position magnets 31 are moved along the selecting/shifting guide magnets 35 at the same time, and the shifting position magnets 33 are moved along the shifting guide magnets 34.

Then, the three-dimensional sensor 43 detects a final position of the lower end center magnet 41 to generate a gear shift signal corresponding to a first stage.

Figure 14D:
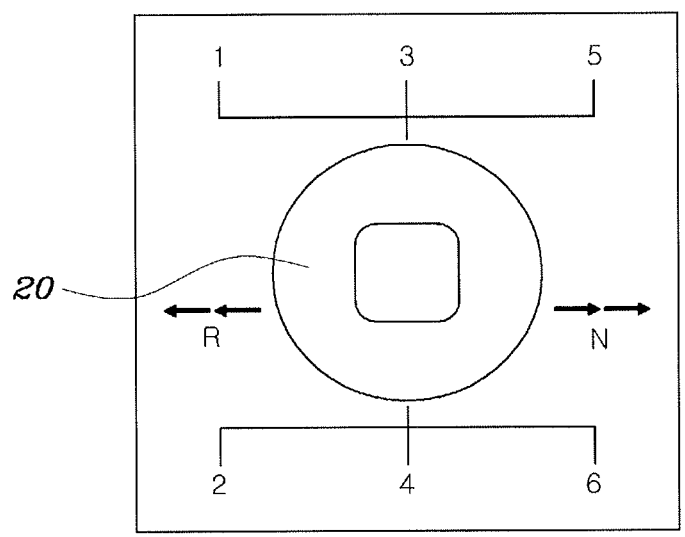
Figure 14D:
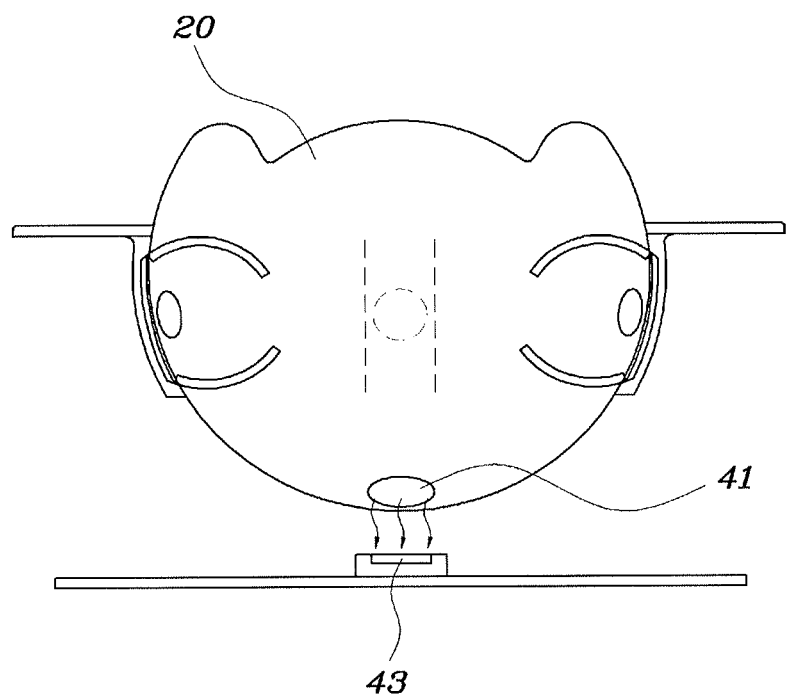

If a user removes an external force from the spherical gear shift lever 20 after the first stage gear shift manipulation is completed, the spherical gear shift lever 20 returns to a neutral position (initial position) as in the state as in FIG. 14D and a next operation is prepared.

As described above, the gear shift lever apparatus of an electronic manual transmission according to the present invention is configured such that the spherical gear shift lever 20 is installed in the console 10 and a protrusion of the spherical gear shift lever 20 into the interior of the vehicle is removed or minimized. Accordingly, injury to a passenger due to the spherical gear shift lever 20 can be prevented during an accident.

The present invention can minimize a stroke according to a gear shift manipulation as the spherical gear shift lever 20 is used, and accordingly, can improve a convenience of a user according to a gear shift manipulation and achieve an advantageous package layout of peripheral components (a parking lever, a center fascia and the like) of the gear shift lever.

Further, the present invention can increase a degree of freedom in design through the spherical gear shift lever 20, realizing a luxurious image of the vehicle.

According to the gear shift lever apparatus of an electronic manual transmission for a vehicle, a spherical gear shift lever is inserted into a console, so that a protrusion of the spherical gear shift lever into an interior of a vehicle can be eliminated or minimized and accordingly, an injury to a passenger by the spherical gear shift lever can be prevented in advance when an accident occurs.

Further, since a stroke according to a gear shift manipulation through the spherical gear shift lever can be minimized, a convenience of a driver according to the gear shift manipulation can be improved and a package layout of peripheral components of the gear shift lever can be advantageously determined.

In addition, since a degree of freedom in design can be increased through the spherical gear shift lever, and accordingly, a luxurious image of the vehicle can be achieved.

For convenience in explanation and accurate definition in the appended claims, the terms "upper" or "lower", "left" or "right" "forward" or "rearward", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A gear shift lever apparatus of an electronic manual transmission for a vehicle, comprising:
    a spherical gear shift lever installed in a console to be rotated in leftward and rightward selecting directions and in forward and rearward shifting directions;
    a lever guide unit installed in the spherical gear shift lever and the console, for guiding rotation of the spherical gear shift lever when the spherical gear shift lever is rotated in the selecting directions and the shifting directions; and
    a lever sensor unit installed in the spherical gear shift lever and the console, for detecting a neutral position and/or a selected gear shift stage of the spherical gear shift lever among gear shift stages,
    wherein the lever sensor unit includes:
        a lower end center magnet installed at a center of a lower end of the spherical gear shift lever;
        an attractive force generating member fixedly installed on a bottom surface of the console facing the lower end center magnet, for applying an attractive force with the lower end center magnet; and
        a three-dimensional sensor for detecting a position of the lower end center magnet when the spherical gear shift lever is selecting-rotated and/or shifting-rotated to detect the neutral position and/or the selected gear shift stage of the spherical gear shift lever, and
    wherein the three-dimensional sensor is embedded in the attractive force generating member and an upper surface of the three-dimensional sensor is exposed to the outside of the attractive force generating member to face the lower end center magnet, and the gear shift lever apparatus of an electronic manual transmission for a vehicle has only one sensor which is the three-dimensional sensor.

2. The gear shift lever apparatus of claim 1, wherein an installation hole for installation of the spherical gear shift lever is formed in the console, and a positioning surface having substantially the same curve as that of an outer circumference of the spherical gear shift lever is formed between an upper surface of the console and the installation hole such that the spherical gear shift lever is rotatably installed while being positioned on the positioning surface.

3. The gear shift lever apparatus of claim 2, wherein the center of the upper end of the spherical gear shift lever is exposed to an upper side of the console, and a center of a lower end of the spherical gear shift lever passes through the installation hole to be exposed to the bottom surface of the console.

4. The gear shift lever apparatus of claim 2, wherein the lever guide unit includes:
    two selecting position magnets installed on an outer circumferential surface in the selecting directions of the spherical gear shift lever; and
    two selecting guide magnets installed on the positioning surface of the console to face the selecting position magnets, respectively.

5. The gear shift lever apparatus of claim 4, wherein the two selecting position magnets are located on a selecting direction center line crossing a center of an upper end of the spherical gear shift lever when the spherical gear shift lever is viewed from a top and are installed at an interval of substantially 180 degrees.

6. The gear shift lever apparatus of claim 4, wherein the lever guide unit further includes:
    two shifting position magnets installed on an outer circumferential surface in the shifting directions of the spherical gear shift lever; and
    two shifting guide magnets installed on the positioning surface of the console to face the shifting position magnets, respectively.

7. The gear shift lever apparatus of claim 6, wherein the two shifting position magnets are located on a shifting direction center line crossing the center of the upper end of the spherical gear shift lever when the spherical gear shift lever is viewed from the top and are installed at an interval of substantially 180 degrees.

8. The gear shift lever apparatus of claim 6, wherein the lever guide unit further includes two selecting/shifting guide magnets installed on the positioning surface of the console to be located at opposite ends of the selecting guide magnets, for guiding movement of the selecting position magnets when the spherical gear shift lever is selecting-rotated and then shifting-rotated continuously.

9. The gear shift lever apparatus of claim 8, wherein an attractive force is applied between the selecting position magnets and the selecting/shifting guide magnets.

10. The gear shift lever apparatus of claim 8, wherein one or each of the two selecting/shifting guide magnets is formed to have an arc-shaped curve along movement loci of the selecting position magnets according to the shifting-rotation of the spherical gear shift lever when the spherical gear shift lever is selecting-rotated and then shifting-rotated continuously.

11. The gear shift lever apparatus of claim 10, wherein the two selecting/shifting guide magnets each having an arc-shaped curve are vertically substantially symmetrical to each other about the selecting position magnets.

12. The gear shift lever apparatus of claim 10, wherein the two selecting/shifting guide magnets each having an arc-shaped curve are left-right substantially symmetrical to each other about the selecting guide magnets.

13. The gear shift lever apparatus of claim 6, wherein an attractive force is applied between the shifting position magnets and the shifting guide magnets.

14. The gear shift lever apparatus of claim 6, wherein one or each of the selecting guide magnets and the shifting guide magnets has a rectangular cross-section, and opposite ends thereof extend along a heightwise direction of the positioning surface of the console.

15. The gear shift lever apparatus of claim 6, wherein a strength of an attractive force generating between the selecting position magnets and the selecting guide magnets, a strength of an attractive force generated between the shifting position magnets and the shifting guide magnets, and a strength of an attractive force generating between the selecting position magnets and the selecting/shifting guide magnets are substantially the same, and a strength of an attractive force generated between the lower end center magnet and the attractive force generating member is at least two times higher than the strength of an attractive force generated between the selecting position magnets and the selecting guide magnets.

16. The gear shift lever apparatus of claim 4, wherein an attractive force is applied between the selecting position magnets and the selecting guide magnets.

17. The gear shift lever apparatus of claim 1, wherein a manipulation recess is formed at a center or a center portion of an upper end of the spherical gear shift lever for manipulation of the spherical gear shift lever.

18. The gear shift lever apparatus of claim 1, wherein if the spherical gear shift lever is selecting-rotated and then shifting-rotated continuously, one of the gear shift stages is selected, and the three-dimensional sensor generates a signal for the selected gear shift stage.

* * * * *